(12) United States Patent
Nagashiro (10) Patent No.: US 8,150,256 B2
(45) Date of Patent: Apr. 3, 2012

(54) ELECTRONIC APPARATUS, IMAGING APPARATUS, AND GRIP STRUCTURE

(75) Inventor: Keiichi Nagashiro, Osaka (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/703,301

(22) Filed: Feb. 10, 2010

(65) Prior Publication Data

US 2010/0215356 A1 Aug. 26, 2010

(30) Foreign Application Priority Data

Feb. 25, 2009 (JP) ................................. 2009-041711

(51) Int. Cl.
*G03B 17/02* (2006.01)
*G03B 9/64* (2006.01)
*H04N 5/225* (2006.01)
*H04N 5/232* (2006.01)

(52) U.S. Cl. .......... 396/535; 396/472; 396/56; 348/373; 348/211.2

(58) Field of Classification Search .................. 396/535, 396/540, 155, 286, 439, 56, 58, 59, 436, 396/264, 472; 348/373, 370, 371, 211.99, 348/211.1, 211.2, 211.4

See application file for complete search history.

(56) References Cited

U.S. PATENT DOCUMENTS

| 5,305,030 A * | 4/1994 | Yokoyama et al. ............. 396/27 |
| 5,715,480 A * | 2/1998 | Nonaka ........................... 396/59 |
| 5,870,636 A * | 2/1999 | Sugita et al. .................. 396/106 |
| 2006/0226953 A1* | 10/2006 | Shelley et al. ............... 340/5.62 |

FOREIGN PATENT DOCUMENTS

JP 2008-015476 A 1/2008

* cited by examiner

*Primary Examiner* — Rochelle-Ann J Blackman
(74) *Attorney, Agent, or Firm* — Wolf, Greenfield & Sacks, P.C.

(57) ABSTRACT

An electronic apparatus includes: a window member containing a material that attenuates visible light but transmits specific light that does not lie in the wavelength band of visible light, the window member having a front wall portion having a thickness extending along the direction from the front side to the rear side; a light emitter provided behind the front wall portion, the light emitter emitting the visible light through a first area of the front wall portion; and a light receiver provided behind the front wall portion, the light receiver receiving the specific light passing through a second area of the front wall portion that differs from the first area, wherein the front wall portion in the first area is thinner than the front wall portion in the second area.

6 Claims, 6 Drawing Sheets

FIG.11

ELECTRONIC APPARATUS, IMAGING APPARATUS, AND GRIP STRUCTURE

BACKGROUND OF THE INVENTION

1. Field of the Invention

The present invention relates to a technology of an electronic apparatus including a window member containing a material that attenuates visible light but transmits specific light that does not lie in the wavelength band of the visible light.

2. Description of the Related Art

In a digital camera or other imaging apparatuses (electronic apparatus) capable of self-timer imaging and remote operation using a remote controller, a window for a self-timer and a window for receiving infrared light from the remote controller are typically provided on the outer surface of the imaging apparatus (see JP-A-2008-15476, for example).

The window for receiving the light from the remote controller needs to be formed as a window (window for receiving specific light) made of a material (IR material) that attenuates the light having wavelengths other than that of infrared rays but primarily transmits infrared light (specific light) in order to prevent decrease in sensitivity and malfunction of the remote controller. On the other hand, the window for the self-timer needs to be formed as a window (window through which visible light exits) made of a material that transmits visible light so that visible light can exit through the window. The two windows are therefore made of different materials and provided separately.

SUMMARY OF THE INVENTION

However, separately providing the window for a self-timer (window through which visible light exits) and the window for receiving the light from the remote controller (window for receiving specific light other than visible light) as described with reference to the above imaging apparatus typically requires preparing a space for disposing the two windows on the exterior surface of the imaging apparatus. Such an extra space prevents the imaging apparatus, for example, from being reduced in size.

Thus, it is desirable to provide a technology of an electronic apparatus by which the space for disposing a window for transmitting visible light and a window for receiving specific light other than visible light can be reduced.

An embodiment of the invention is directed to an electronic apparatus including a window member containing a material that attenuates visible light but transmits specific light that does not lie in the wavelength band of visible light, the window member having a front wall portion having a thickness extending along the direction from the front side to the rear side, a light emitter provided behind the front wall portion, the light emitter emitting the visible light through a first area of the front wall portion, and a light receiver provided behind the front wall portion, the light receiver receiving the specific light passing through a second area of the front wall portion that differs from the first area. The front wall portion in the first area is thinner than the front wall portion in the second area.

Another embodiment of the invention is directed to an imaging apparatus including a window member containing a material that attenuates visible light but transmits specific light that does not lie in the wavelength band of visible light, the window member having a front wall portion having a thickness extending along the direction from the front side to the rear side, a light emitter provided behind the front wall portion, the light emitter emitting the visible light through a first area of the front wall portion, and a light receiver provided behind the front wall portion, the light receiver receiving the specific light passing through a second area of the front wall portion that differs from the first area. The front wall portion in the first area is thinner than the front wall portion in the second area.

Still another embodiment of the invention is directed to a grip structure including a window member containing a material that attenuates visible light but transmits specific light that does not lie in the wavelength band of visible light, the window member having a front wall portion having a thickness extending along the direction from the front side to the rear side, and a grip in which the window member is assembled, the grip used as a portion to be gripped. The visible light from a light emitter provided behind the front wall portion exits through a first area of the front wall portion, and a light receiver provided behind the front wall portion receives the specific light passing through a second area of the front wall portion that differs from the first area. The front wall portion in the first area is thinner than the front wall portion in the second area.

According to the embodiments of the invention, there is provided a window member containing a material that attenuates visible light but transmits specific light that does not lie in the wavelength band of visible light, the window member having a front wall portion having a thickness extending along the direction from the front side to the rear side. The visible light from a light emitter provided behind the front wall portion exits through a first area of the front wall portion, and a light receiver provided behind the front wall portion receives the specific light passing through a second area of the front wall portion that differs from the first area. The front wall portion in the first area is thinner than the front wall portion in the second area. As a result, the window through which the visible light exits and the window through which the specific light other than visible light is received can be disposed in a small space.

DESCRIPTION OF THE PREFERRED EMBODIMENTS

First Embodiment

Configuration of Key Portion of Imaging Apparatus

Figure 1:
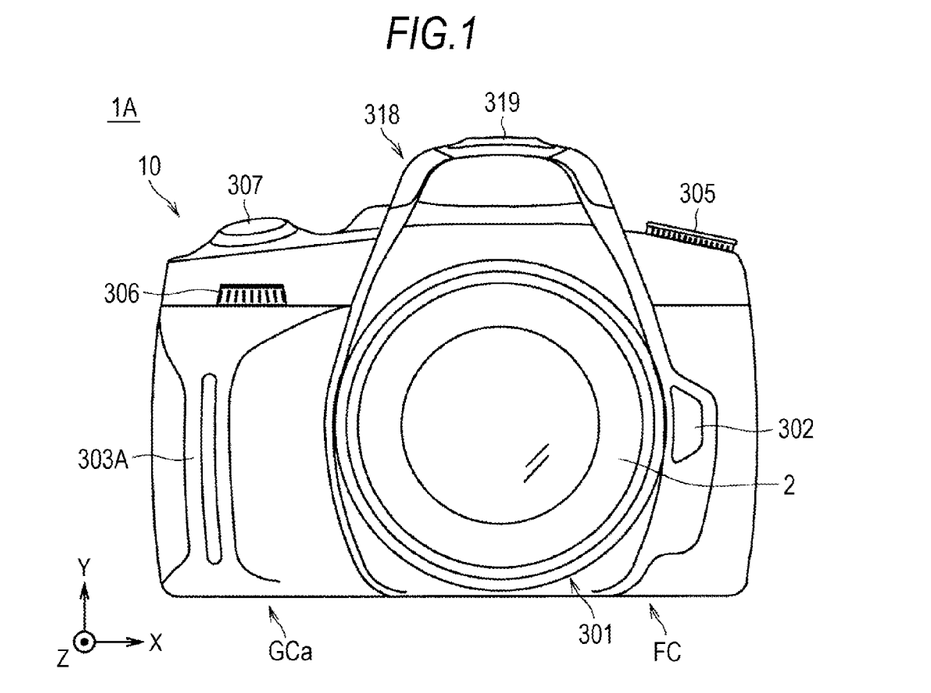
FIG. 1 shows the exterior configuration of an imaging apparatus according to a first embodiment of the invention.
Figure 2:
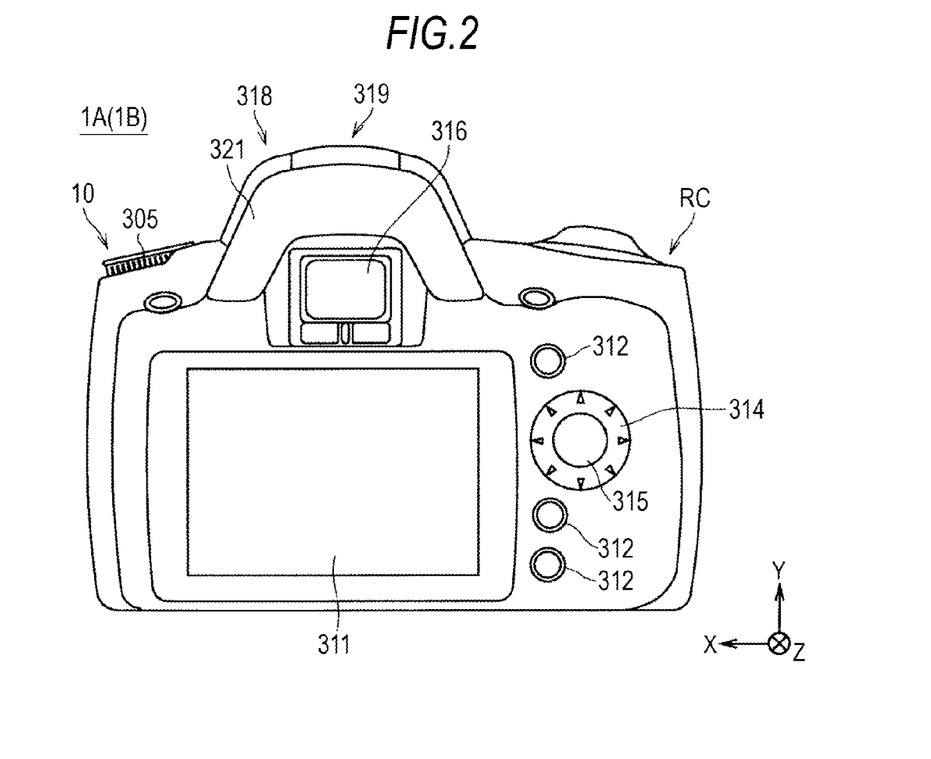
FIG. 2 shows the exterior configuration of the imaging apparatus according to the first embodiment.

FIGS. 1 and 2 show the exterior configuration of an imaging apparatus 1A according to a first embodiment of the invention. FIGS. 1 and 2 are front and rear exterior views of the imaging apparatus 1A, respectively. The imaging apparatus 1A functions as a portable electronic apparatus configured, for example, as a single-lens reflex digital still camera and includes a camera body 10 and an interchangeable lens 2 as an imaging lens that can be attached and detached to and from the camera body 10.

The housing of the camera body 10 is formed of a plurality of parts including a front cover FC (FIG. 1) and a rear cover RC (FIG. 2) made of a plastic material or any other suitable material and a grip cover GCa whose surface is made of rubber or any other suitable material. The configuration of the grip cover GCa will be described later in detail.

FIG. 1 shows the following components provided on the front side of the camera body 10: a mount 301 that is disposed in a substantially central portion of the front side and to which the interchangeable lens 2 is attached, a lens interchanging button 302 disposed to the right of the mount 301, and a grip 303A protruding from the surface of the camera body 10 in a front left end portion (on the left side in the X direction) to allow a user to reliably grip (hold) the camera body 10 with one hand (or both hands). The camera body 10 further includes a mode setting dial 305 disposed in an upper right portion when viewed from the front (on the upper right side in the Y direction), a shutter button 307 disposed in an upper left portion when viewed from the front, and a control value setting dial 306 disposed below the shutter button 307.

FIG. 2 shows the following components provided on the rear side of the camera body 10: an LCD (Liquid Crystal Display) 311, setting buttons 312 disposed in the vicinity of the LCD 311, a cross-shaped key 314 disposed to the right of the LCD 311, a push button 315 disposed at the center of the cross-shaped key 314, an optical finder 316 disposed above the LCD 311, an eye cup 321 that surrounds the optical finder 316, and a flashlight 318 and a connection terminal 319 disposed above the optical finder 316.

The mount 301 is a portion for attaching the interchangeable lens 2 and includes a connector Ec (see FIG. 3) for electrically connecting the mount 301 to the attached interchangeable lens 2 and a coupler 75 (see FIG. 3) for mechanically connecting the two components.

The lens interchanging button 302 is pressed down to detach the interchangeable lens 2 attached to the mount 301.

The grip 303A is part of the grip cover GCa and where the user grips the camera body 10 during imaging. A battery compartment and a card compartment are provided behind the grip 303A. The battery compartment houses a battery 69B (see FIG. 3) as a power source of the camera, and the card compartment detachably houses a memory card 67 (see FIG. 3), which is a recording medium for recording image data on captured images.

The mode setting dial 305 is formed of a substantially disc-shaped member rotatable in a plane substantially parallel to the upper surface of the camera body 10. The mode setting dial 305 is provided to select any one of the modes and functions provided in the camera body 10, such as an auto-exposure (AE) control mode, an autofocus (AF) control mode, a variety of imaging modes including a still image capture mode for capturing a single still image and a continuous imaging mode for continuously capturing images, and a reproducing mode for reproducing recorded images. On the other hand, the control value setting dial 306 is provided to set control values used in the variety of functions provided in the camera body 10.

The shutter button 307 is a push-down switch that allows two operation states, a "half-pressed state" in which the shutter button 307 is pressed halfway and a "fully-pressed state" in which the shutter button 307 is further pressed. When the shutter button 307 is pressed halfway (S1) in the still image capture mode, preparation actions for capturing a still image of a subject (preparation actions, such as setting an exposure control value and adjusting the focus) are carried out. When the shutter button 307 is then fully pressed (S2), imaging actions (a series of actions including exposing an imaging device to light, performing predetermined image processing on an image signal obtained by the exposure action, and recording the resultant image signal in the memory card or any other suitable recording medium) are carried out.

The LCD 311 includes a color liquid crystal panel. The LCD 311 not only displays an image captured by an imaging device 101 (see FIG. 3) and reproduces and displays a recorded image, but also displays a setting screen for setting the functions and modes provided in the camera body 10.

The setting buttons 312 are provided to operate the variety of functions provided in the camera body 10. The setting buttons 312 includes a selection acceptance switch for accepting the operation selected in a menu screen displayed on the LCD 311, a selection cancel switch, a menu display switch for switching the operation displayed on the menu screen, a display on/off switch, and a display enlarging switch.

The cross-shaped key 314 has an annular member including a plurality of pressing portions disposed at equal spacings in the circumferential direction (the portions indicated by the triangular marks in FIG. 2), and contacts (switches) (not shown) provided in correspondence with the pressing portions to detect pressing operations performed on the respective pressing portions. The push button 315 is disposed at the center of the cross-shaped key 314. The cross-shaped key 314 and the push button 315 are provided to input instructions, such as changing the imaging magnification (moving a zoom lens toward a wide angle side or a telescopic side), advancing frames of recorded images to be reproduced on the LCD 311, and setting imaging conditions (such as the aperture setting, shutter speed, and flashlight activation).

The optical finder 316 optically displays the area in which a subject is imaged. That is, an image of the subject is guided through the interchangeable lens 2 to the optical finder 316, and the user looks into the optical finder 316 to visually recognize the subject to be actually imaged by the imaging device 101.

The flashlight 318 is formed of a popup-type, built-in flashlight. On the other hand, an external flashlight or any other component is attached to the camera body 10 by using the connection terminal 319.

The eye cup 321 is a light-blocking member that prevents external light from entering the optical finder 316.

The interchangeable lens 2 functions as not only a lens window through which the light from a subject (optical image) passes but also an imaging optical system for guiding the subject light to the imaging device 101, which is disposed in the camera body 10 and will be described later, and the optical finder 316. The interchangeable lens 2 can be detached from the camera body 10 by pressing down the lens interchanging button 302 described above.

Figure 3:
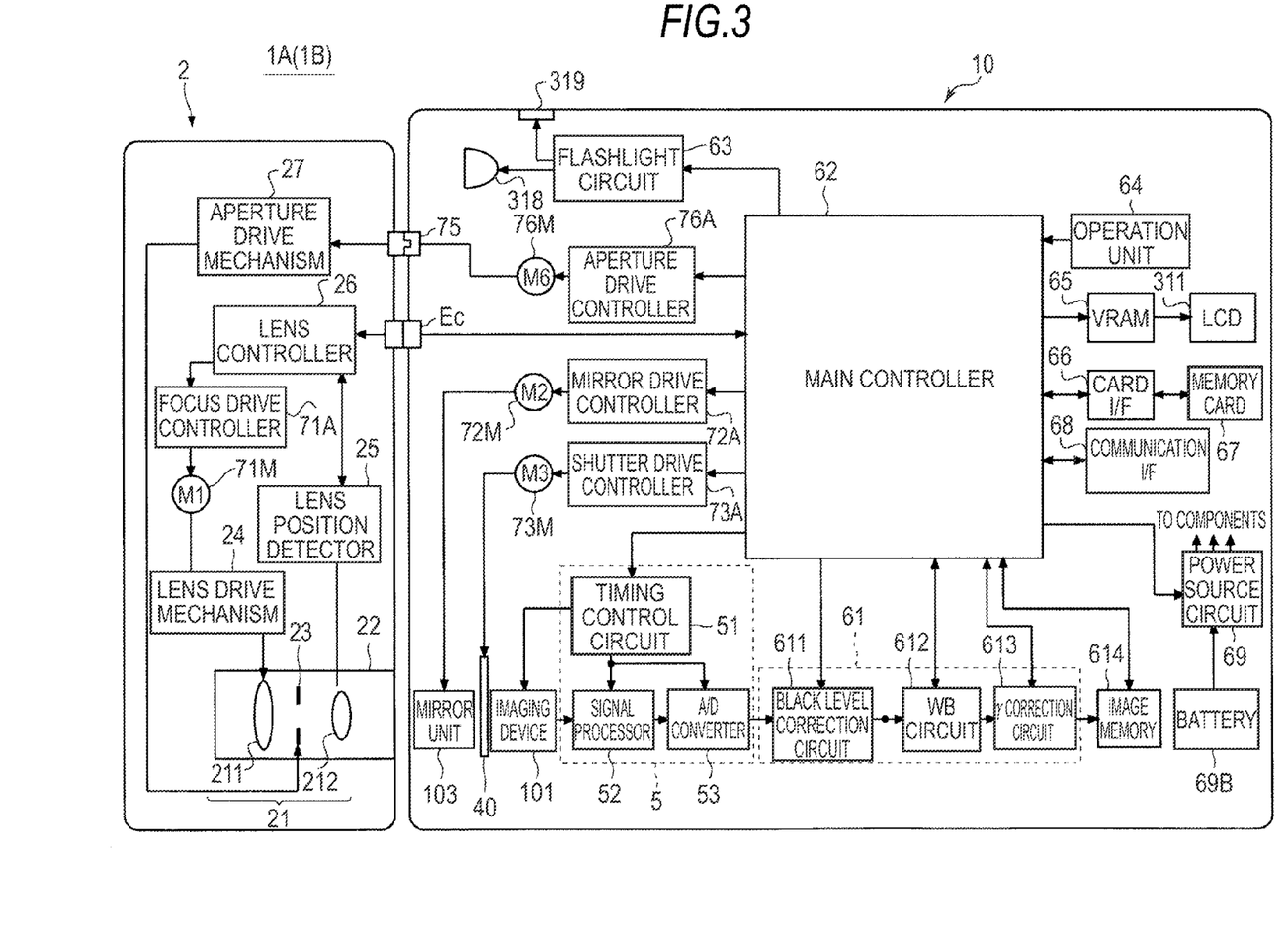
FIG. 3 is a block diagram showing the electrical configuration of the imaging apparatus according to the first embodiment.

The interchangeable lens 2 includes a lens group 21 formed of a plurality of lenses disposed in series along the optical axis (see FIG. 3). The lens group 21 includes a focus lens 211 (see FIG. 3) for adjusting the focus and a zoom lens 212 (see FIG. 3) for changing the magnification. Moving the focus lens and the zoom lens along the optical axis allows the magnification to be changed and the focus to be adjusted, respectively. The interchangeable lens 2 further includes an operation ring provided in an appropriate outer circumferential portion of a lens barrel of the interchangeable lens 2, and the operation ring is rotatable along the outer circumferential surface of the lens barrel. The zoom lens 212 moves along the optical axis manually or automatically in accordance with the direction and amount of rotation of the operation ring, and the zoom magnification (imaging magnification) is set in accordance with the position to which the zoom lens has moved.

[Electrical Configuration of Imaging Apparatus 1A]

FIG. 3 is a block diagram showing the electrical configuration of the imaging apparatus 1A. The members and other components that are the same as those in FIGS. 1 and 2 have the same reference characters. The electrical configuration of the interchangeable lens 2 will first be described for ease of illustration.

The interchangeable lens 2 includes not only the lens group 21 described above, which forms the imaging optical system, but also a focus drive controller 71A and an AF actuator 71M, a lens drive mechanism 24, a lens position detector 25, a lens controller 26, and an aperture drive mechanism 27.

In the lens group 21, the focus lens 211, the zoom lens 212, and an aperture 23 for adjusting the amount of light to be incident on the imaging device 101 disposed in the camera body 10 are held in the lens barrel 22 along the optical axis of the interchangeable lens 2, capture an optical image of a subject, and focus it on the imaging device 101. In AF control, the AF actuator 71M in the interchangeable lens 2 moves the focus lens 211 along the optical axis for focus adjustment.

The focus drive controller 71A produces a drive control signal, which is necessary to move the focus lens 211 to a focused position and sent to the AF actuator 71M, based on an AF control signal provided from a main controller 62 via the lens controller 26. The AF actuator 71M is formed of a stepper motor or any other suitable component and supplies a lens driving force to the lens drive mechanism 24.

The lens drive mechanism 24 is formed of, for example, a helicoid and a gear or any other suitable component (not shown) that rotates the helicoid, receives the driving force from the AF actuator 71M, and moves the focus lens 211 and other components in the direction parallel to the optical axis. The direction in which the focus lens 211 is moved and the amount of movement thereof are determined by the rotating direction and the number of rotation of the AF actuator 71M, respectively.

The lens position detector 25 includes an encode plate on which a plurality of code patterns are formed at predetermined spacings in the optical axis direction within the range in which the lens group 21 moves and an encoder brush that moves integrally with the lens group 21 and slides along the encode plate. The lens position detector 25 detects the amount of movement of the lens group 21 when the focus adjustment is carried out. The lens position detected by the lens position detector 25 is outputted, for example, in the form of the number of pulses.

The lens controller 26 is formed of, for example, a microcomputer that houses a ROM for storing a control program and other information, a flash memory for storing data on state information, and other memories.

The lens controller 26 has a communication function by which the lens controller 26 can communicate with the main controller 62 in the camera body 10 via the connector Ec. The communication function allows not only the focus length of the lens group 21, the position of an exit pupil, the aperture setting, the distance at which the focus is achieved, the amount of peripheral light, and other state information data as well as the information on the position of the focus lens 211 detected by the lens position detector 25 to be sent to the main controller 62 but also data on the amount by which the focus lens 211 should be moved and other information to be received from the main controller 62.

The aperture drive mechanism 27 receives a driving force from an aperture drive actuator 76M via the coupler 75 and changes the diameter of the aperture 23.

The electrical configuration of the camera body 10 will next be described. The camera body 10 includes the imaging device 101, a shutter unit 40, an AFE (Analog Front End) 5, an image processor 61, an image memory 614, the main controller 62, a flashlight circuit 63, an operation unit 64, a VRAM 65, a card interface (I/F) 66, the memory card 67, and a communication interface (I/F) 68. The camera body 10 further includes a power source circuit 69, the battery 69B, a mirror drive controller 72A and a mirror drive actuator 72M, a shutter drive controller 73A and a shutter drive actuator 73M, and an aperture drive controller 76A and the aperture drive actuator 76M.

The imaging device 101 is disposed in the optical axis of the lens group 21 contained the interchangeable lens 2 attached to the camera body 10 in such a way that the imaging device 101 is perpendicular to the optical axis. The imaging device 101 is, for example, a CMOS color area sensor (CMOS-type imaging device) in which a plurality of pixels, each of which being a photodiode, are arranged in a two-dimensional matrix. The imaging device 101 produces analog electric signals (image signals) of R (red), G (green), and B (blue) color components contained in a subject light flux received through the interchangeable lens 2, and outputs the analog electric signals as R, G, and B image signals.

A timing control circuit 51, which will be described later, controls imaging operations performed in the imaging device 101. For example, the timing control circuit 51 starts (and stops) exposure of the imaging device 101 to light, outputs the charge in the pixels contained in the imaging device 101, and reads pixel signals.

The shutter unit 40 is disposed in front of the imaging device 101 in the optical axis direction. The shutter unit 40 is configured as a mechanical focal-plane shutter that includes a vertically moving screen and closes or opens the screen to block or unblock the optical path of the subject light guided to the imaging device 101 along the optical axis of the interchangeable lens 2. The shutter unit 40 can be omitted when the imaging device 101 has a fully electronic shutter capability.

The AFE 5 provides timing pulses that allow the imaging device 101 to carry out a predetermined action, performs predetermined signal processing on the image signals outputted from the imaging device 101 (a group of analog signals corresponding to the light received by the pixels that form the CMOS area sensor), converts the image signals into digital signals, and outputs the digital signals to the image processor 61. The AFE 5 includes the timing control circuit 51, a signal processor 52, and an A/D converter 53.

The timing control circuit 51 controls the imaging operation of the imaging device 101 by producing predetermined timing pulses (vertical scan pulses φVn, horizontal scan pulses φVm, and pulses used to produce a reset signal (φVr and other signals) based on a reference clock outputted from the main controller 62 and outputting the timing pulses to the imaging device 101. The timing control circuit 51 also controls the operations of the signal processor 52 and the A/D converter 53 by outputting predetermined timing pulses thereto.

The signal processor 52 performs predetermined analog signal processing on the analog image signals outputted from the imaging device 101. The signal processor 52 includes a CDS (Correlated Double Sampling) circuit, an AGC (Auto-Gain Control) circuit, and a clamp circuit. The A/D converter 53 converts the analog RGB image signals outputted from the signal processor 52 into digital image signals expressed by a plurality of bits (12 bits, for example) based on the corresponding timing pulses outputted from the timing control circuit 51.

The image processor 61, which performs predetermined signal processing on the image data outputted from the AFE 5 to create an image file, includes a black level correction circuit 611, a white balance control circuit 612, and a gamma correction circuit 613. The image data grabbed by the image processor 61 are temporality written in the image memory 614 in synchronization with the reading operation performed in the imaging device 101. The image data written in the image memory 614 are accessed and processed in the blocks in the image processor 61 in the following processes.

The black level correction circuit 611 corrects the black level of each of the RGB digital image signals, which have been converted from the analog signals by the A/D converter 53, to a reference black level.

The white balance control circuit 612 performs level conversion (white balance (WB) adjustment) on the digital signals of the R (red), G (green), and B (blue) color components based on a white reference according to a light source. That is, the white balance control circuit 612 identifies portions in the imaged subject that are estimated to be inherently white based on WB adjustment data provided from the main controller 62 along with the data on the brightness, chroma, and other parameters, determines the average values of the RGB color components, the G/R ratio, and the G/B ratio in each of the identified portions, and performs level correction by using the ratios as correction gains for the R and B components.

The gamma correction circuit 613 corrects the grayscale characteristics of the image data that have undergone the WB adjustment. Specifically, the gamma correction circuit 613 uses a gamma correction table set in advance for each of the color components to perform nonlinear conversion and offset adjustment on the level of the image data.

In an imaging mode, the image memory 614 temporarily stores the image data outputted from the image processor 61 and is used as a work area where the main controller 62 performs predetermined processing on the image data. In a playback mode, the image memory 614 temporarily stores image data read from the memory card 67.

The main controller 62 is formed of, for example, a microcomputer that houses a ROM for storing a control program, a RAM for temporarily storing data, and other storage sections, and controls the operations of the portions that form the imaging apparatus 1A.

In an imaging mode using flashlight, the flashlight circuit 63 controls the amount of light emitted from the flashlight 318 or an external flashlight connected to the connection terminal 319 to be the amount of light emission set by the main controller 62.

The operation unit 64 includes the mode setting dial 305, the control value setting dial 306, the shutter button 307, the cross-shaped key 314, and the push button 315 described above, and is used to input operational information to the main controller 62.

The VRAM 65 is a buffer memory having a capacity of storing image signals corresponding to the number of pixels of the LCD 311 and disposed between the main controller 62 and the LCD 311. The card I/F 66 is an interface that allows signal communication between the memory card 67 and the main controller 62. The memory card 67 is a recording medium that stores image data produced by the main controller 62. The communication I/F 68 is an interface that allows image data and other information to be transferred to a personal computer and other external apparatus.

The power source circuit 69 is formed of, for example, a constant voltage circuit and produces voltages for driving the entire imaging apparatus 1A, including the main controller 62 and other controllers, the imaging device 101, and a variety of other drivers. The control of conducting current to the imaging device 101 is carried out based on a control signal provided from the main controller 62 to the power source circuit 69. The battery 69B is a power source formed of a nickel-hydrogen rechargeable cell or any other suitable secondary battery or an alkali dry cell or any other suitable primary battery. The battery 69B supplies electric power to the entire imaging apparatus 1A.

The mirror drive controller 72A produces a drive signal for driving the mirror drive actuator 72M in synchronization with the imaging operation timing. The mirror drive actuator 72M is an actuator that turns a mirror unit 103, which is configured to be, for example, a quick-return mirror, and sets it in a horizontal or inclined attitude.

The shutter drive controller 73A produces a drive control signal to be sent to the shutter drive actuator 73M based on a control signal provided from the main controller 62. The shutter drive actuator 73M is an actuator that opens and closes the shutter unit 40.

The aperture drive controller 76A produces a drive control signal to be sent to the aperture drive actuator 76M based on a control signal provided from the main controller 62. The aperture drive actuator 76M supplies a driving force to the aperture drive mechanism 27 via the coupler 75.

[Configuration of Grip Cover GCa]

Figure 4:
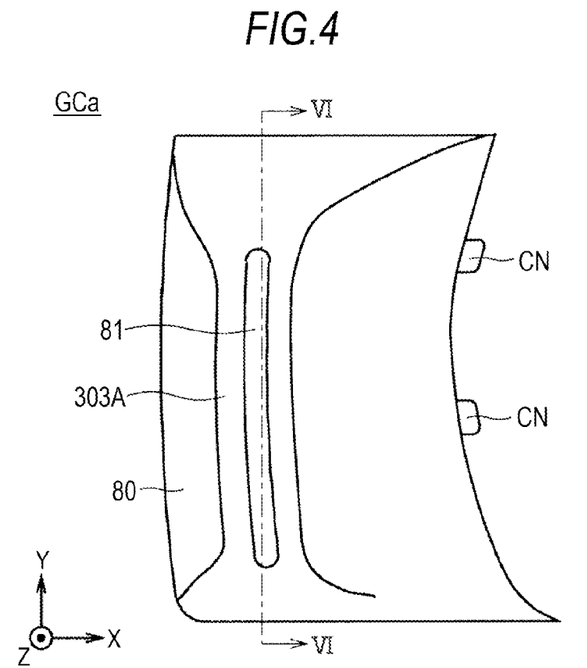
FIG. 4 shows the exterior configuration of a grip cover.
Figure 5:
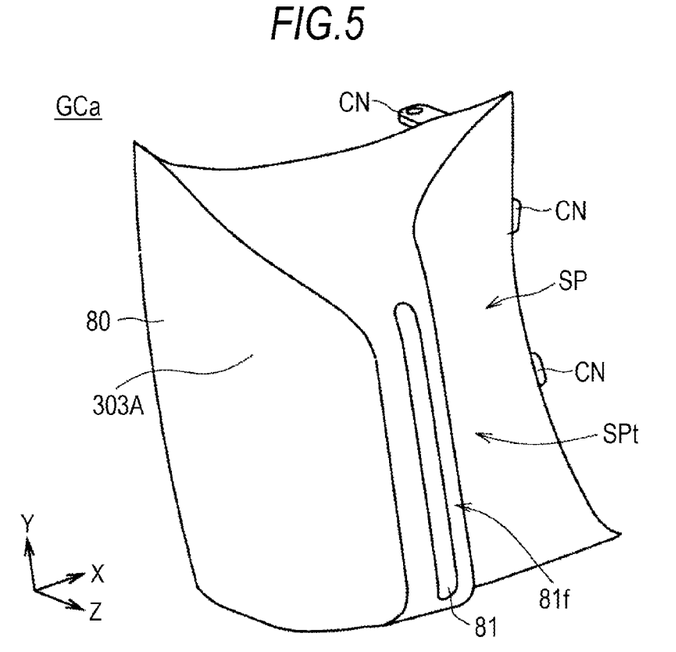
FIG. 5 shows the exterior configuration of the grip cover.
Figure 6:
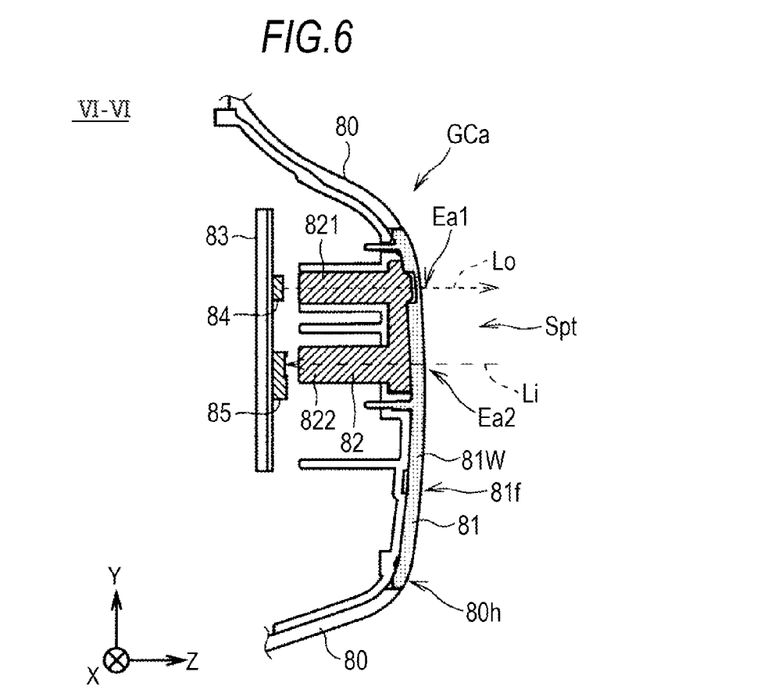
FIG. 6 is a cross-sectional view of the grip cover taken along the line VI-VI in FIG. 4.

FIGS. 4 and 5 show the exterior configuration of the grip cover GCa. FIGS. 4 and 5 are front and perspective exterior views of the grip cover GCa, respectively. FIG. 6 is a cross-sectional view of the grip cover GCa taken along the line VI-VI in FIG. 4.

The grip cover (grip structure) GCa is configured as the housing of the imaging apparatus 1A and includes a body 80 and a window (window member) 81 (meshed in FIG. 6) disposed in the vicinity of the center of the grip 303A, which is part of the body 80. The grip cover GCa further includes a light guide 82 (hatched in FIG. 6) disposed behind the window 81, and a light emitter 84 and a light receiver 85 disposed behind the light guide 82 and mounted on a substrate 83. The grip cover GCa further includes connecting portions CN for connecting the grip cover GCa to other parts that form the housing of the imaging apparatus 1A.

The body 80 is made of rubber or any other similar material and hence has elasticity. The body 80 has a raised portion SP raised forward (in the +Z direction) from the grip 303A gripped by the user, and the raised portion SP has a band-shaped top surface SPt extending along the Y-axis direction. The window 81 fits into a vertically elongated recess 80h formed in the top surface SPt and is secured therein.

The light emitter 84 includes a light emitting device configured, for example, as a light emitting diode (LED), which can emit visible light. The thus configured light emitter 84 is used as a lamp for a self-timer used in self-timer imaging.

The light receiver 85 includes a light receiving device, which functions as a remote controller light receiver that senses infrared rays emitted from the remote controller used to remotely operate the imaging apparatus 1A.

The light guide 82 has a shape obtained by integrating a light guide tube (first light guide) 821 that guides visible light Lo emitted from the light emitter 84 to a light emitting area Ea1 (which will be described later) of the window 81 and another light guide tube (second light guide) 822 that guides infrared light Li emitted from the remote controller outside the imaging apparatus 1A and passing through a light receiving area Ea2 (which will be described later) of the window 81 to the light receiver 85. The light guide (light guide means) 82 can efficiently propagate light between the window 81 and the two optical components, the light emitter 83 and the light receiver 84, which are relatively remote from the window 81.

The window 81 contains a material (IR material) that attenuates visible light, that is, light having wavelengths other than that of infrared rays but transmits infrared light (specific light) that does not lie in the wavelength band of visible light, and the material has a certain amount of rigidity. The window 81 has an elongated band-shaped front surface 81$f$ extending along the Y-axis direction from the vicinity of the upper end of the top surface SPt of the raised portion SP to the vicinity of the lower end thereof, and the front surface 81$f$ and the surface of the body 80 around the front surface 81$f$ form a stepless smooth surface, what is called a flush surface. When the window 81 is assembled in the grip 303A with the longitudinal direction of the front surface 81$f$ substantially aligned with the longitudinal direction of the top surface SPt, the window 81 more rigid than the body 80 not only allows the user, when gripping the grip 303A, to feel more pleasant to the touch but also imparts an accent in terms of exterior appearance.

The window 81 has a front wall portion 81$w$ having a thickness along the direction from the front surface 81$f$ to the rear side (in the −Z direction). The front wall portion 81$w$ has a uniform thickness (approximately 1.5 mm, for example) thereacross, but is locally thin in the area Ea1 (hereinafter also referred to as a "light emitting area") located in front of the light emitter 84 and the light guide tube 821 and having a thickness of, for example, approximately 0.5 mm. When the light emitting area Ea1 is thin as described above, the visible light Lo from the light emitter 84 can pass through the window 81 containing the IR material and exit therefrom. On the other hand, since the area Ea2 (hereinafter also referred to as a "light receiving area") of the front wall portion 81$w$, which is located in front of the light receiver 85 and the light guide tube 822 and differs from the light emitting area Ea1, has a certain thickness, the light receiver 85 can appropriately receive the infrared light from the remote controller through the light receiving area Ea2.

Since the thus configured window 81 allows the window member for the light emitter 84 and the window member for the light receiver 85 to be combined into a single member, the space for disposing the resultant window member can be smaller and the cost can be reduced. The single window member allows the light emitter 84 and the light receiver 85 to be closely located, whereby the light emitter 84 and the light receiver 85 can be mounted on the single substrate 85, and the number of parts and hence the cost can be reduced. Further, since the light outside the wavelength band of infrared rays is attenuated in the light receiving area Ea2 of the window 81 containing the IR material before it reaches the light receiver 85, the infrared light Li emitted from the remote controller outside the imaging apparatus 1A can be appropriately received by the light receiver 85. The configuration prevents decrease in sensitivity and malfunction of the remote controller. On the other hand, since the visible light Lo emitted from the light emitter 84 is incident on the thin light emitting area Ea1 of the window 81, the visible light Lo is not greatly attenuated but can pass through the window 81, whereby the user can visually recognize the visible light Lo.

In the thus configured grip cover GCa of the imaging apparatus 1A, the front wall portion 81$w$ in the light emitting area (first area) Ea1, through which the visible light Lo from the light emitter 84 provided behind the front wall portion 81$w$ passes and from which the visible light Lo exits, is thinner than the light receiving area (second area) Ea2, through which the infrared light (specific light) Li to be received by the light receiver 85 provided behind the front wall portion 81$w$ passes. As a result, the window through which the visible light Lo exits and the window through which the infrared light (specific light other than visible light) Li is received can be combined into the single window (window member) 81, whereby the space for disposing the two windows can be reduced.

Second Embodiment

Figure 7:
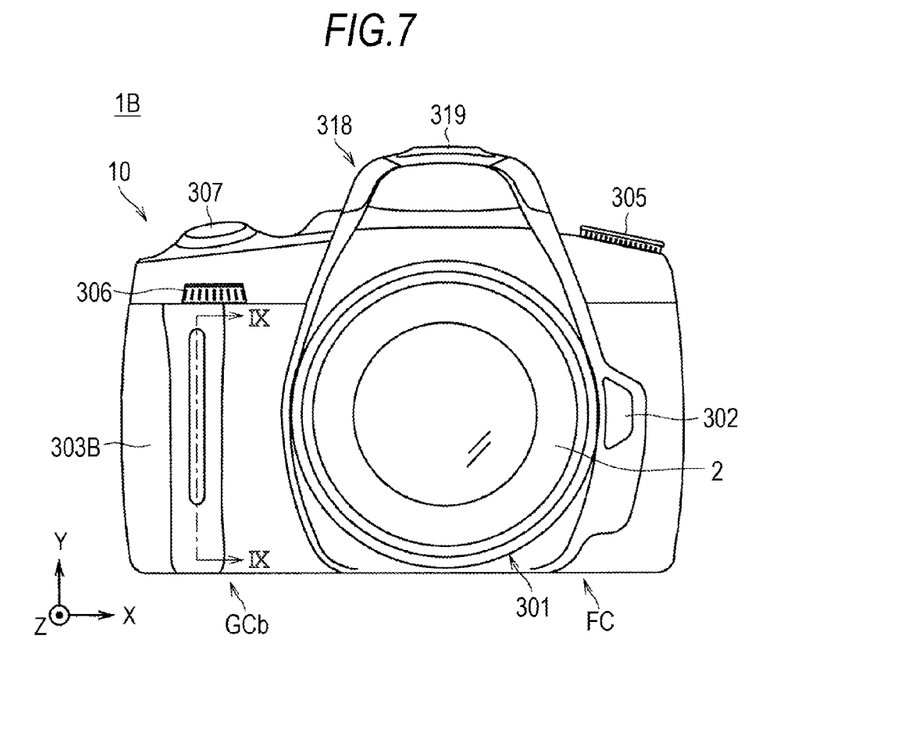
FIG. 7 is a front view showing the exterior configuration of an imaging apparatus according to a second embodiment of the invention.

FIG. 7 is a front view showing the exterior configuration of an imaging apparatus 1B according to a second embodiment of the invention.

The imaging apparatus 1B of the second embodiment is similar to the imaging apparatus 1A of the first embodiment in that the imaging apparatus 1B also has the rear-side configuration shown in FIG. 2 and the electrical configuration shown in FIG. 3 but differs from the imaging apparatus 1A of the first embodiment in that a grip cover GCb is configured as shown in FIG. 7. The configuration of the grip cover GCb will be described below in detail.

[Configuration of Grip Cover GCb]

Figure 8:
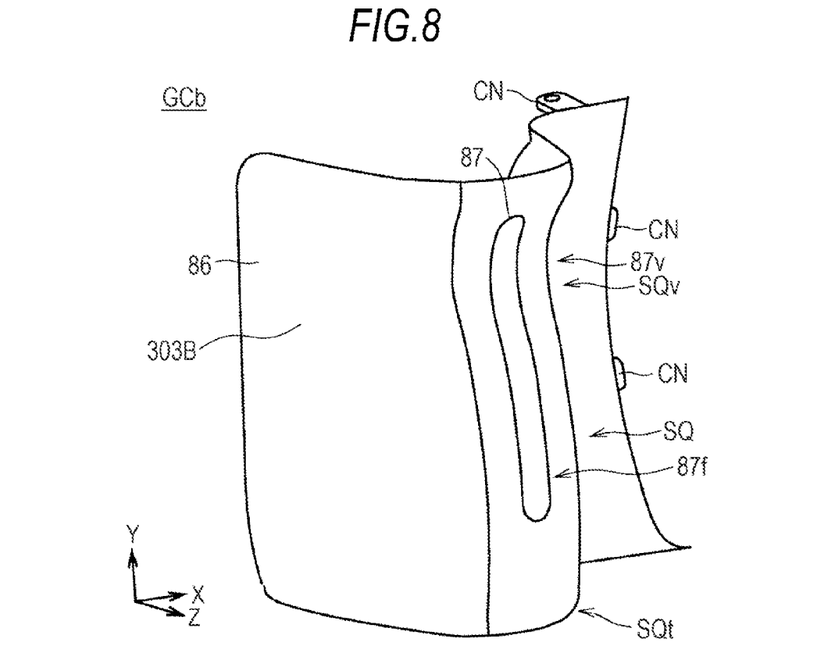
FIG. 8 is a perspective view showing the exterior configuration of a grip cover.
Figure 9:
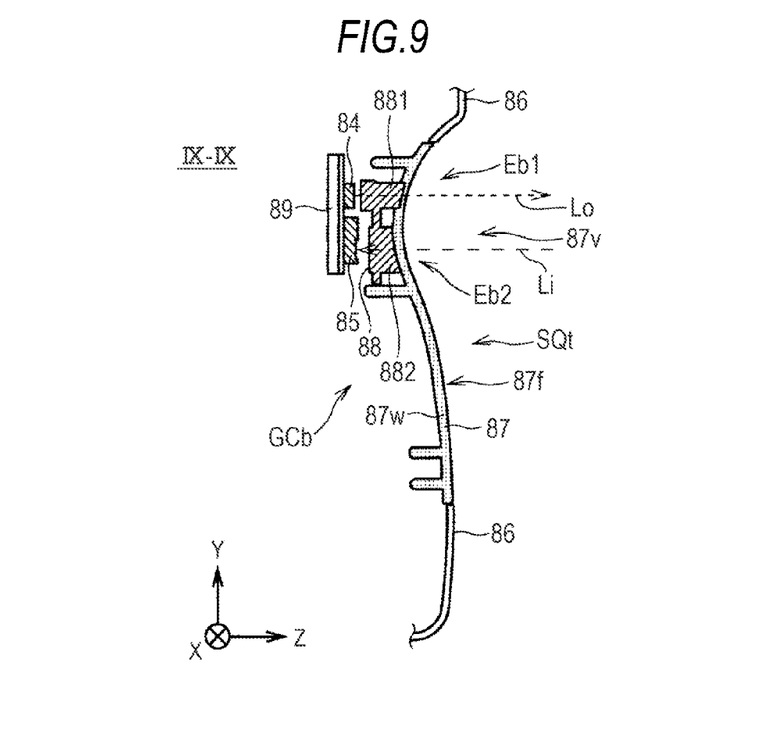
FIG. 9 is a cross-sectional view of the grip cover taken along the line IX-IX in FIG. 7.

FIG. 8 is a perspective view showing the exterior configuration of the grip cover GCb. FIG. 9 is a cross-sectional view of the grip cover GCb taken along the line IX-IX in FIG. 7.

The grip cover GCb has a configuration similar to that of the grip cover GCa of the first embodiment but differs therefrom in terms of the shapes of a body 86, a window 87 (meshed in FIG. 9), and a light guide 88 (hatched in FIG. 9). In the grip cover GCb, the light emitter 84 and the light receiver 85 configured in the same manner as those in the first embodiment are mounted on a substrate 89.

The body 86 is made of rubber or any other similar material and hence has elasticity, like the body 80 in the first embodiment. The body 86 has a raised portion SQ raised forward (in the +Z direction) from a grip 303B gripped by the user, and the raised portion SQ has a band-shaped top surface SQt extending along the Y-axis direction. The vertically elongated window 87 is secured in the top surface SQt. The top surface SQt of the raised portion SQ is not substantially flat, unlike the top surface SPt in the first embodiment, but has a recess SQv as an indentation formed in an upper portion of the top surface SQt.

The light guide 88 has a shape obtained by integrating a light guide tube (first light guide) 881 that guides the visible light Lo emitted from the light emitter 84 to a light emitting area Eb1 (which will be described later) of the window 87 and another light guide tube (second light guide) 882 that guides the infrared light Li emitted from the remote controller outside the imaging apparatus 1B and passing through a light receiving area Eb2 (which will be described later) of the window 87 to the light receiver 85. The light guide (light guide means) 88 can efficiently propagate light between the window 87 and the two optical components, the light emitter 84 and the light receiver 85, which are relatively remote from the window 87.

The window 87 contains an IR material and has a certain amount of rigidity, like the window 81 in the first embodiment. The window 87 has an elongated band-shaped front surface 87f extending along the Y-axis direction within the top surface SQt of the raised portion SQ, and the front surface 87f and the surface of the body 86 around the front surface 87f form a stepless smooth surface, what is called a flush surface. To this end, the front surface 87f of the window 87 has a recess 87v, which is backwardly concave (in the −Z direction) and flush with the recess SQv formed in the raised portion SQ. When the window 87 is assembled in the grip 303B with the longitudinal direction of the front surface 87f substantially aligned with the longitudinal direction of the top surface SQt, the window 87 more rigid than the body 86 not only allows the user, when gripping the grip 303B, to feel more pleasant to the touch but also imparts an accent in terms of exterior appearance.

The window 87 has a front wall portion 87w having a thickness along the direction from the front surface 87f to the rear side (in the −Z direction). The front wall portion 87w has a uniform thickness (approximately 1.5 mm, for example) thereacross, but is locally thin in the area Eb1 (hereinafter also referred to as a "light emitting area") located in front of the light emitter 84 and the light guide tube 881 and having a thickness of, for example, approximately 0.5 mm. The light emitting area Eb1 is disposed in the recess 87v described above. When the light emitting area Eb1 is thin as described above, the visible light Lo from the light emitter 84 can pass through the window 87 containing the IR material and exit therefrom, as in the first embodiment. On the other hand, since the area Eb2 (hereinafter also referred to as a "light receiving area") of the front wall portion 87w, which is located in front of the light receiver 85 and the light guide tube 882, has a certain thickness, the light receiver 85 can appropriately receive the infrared light from the remote controller through the light receiving area Eb2.

Since the thus configured window 87 allows the window member for the light emitter 84 and the window member for the light receiver 85 to be combined into a single member, as in the first embodiment, the space for disposing the resultant window member can be smaller and the cost can be reduced. The single window member allows the light emitter 84 and the light receiver 85 to be mounted on the single substrate 89, whereby the number of parts and hence the cost can be reduced. Further, since the light outside the wavelength band of infrared rays is attenuated in the light receiving area Eb2 of the window 87 containing the IR material before it reaches the light receiver 85, the infrared light Li emitted from the remote controller outside the imaging apparatus 1B can be appropriately received by the light receiver 85. The configuration prevents decrease in sensitivity and malfunction of the remote controller. On the other hand, since the visible light Lo emitted from the light emitter 84 is incident on the thin light emitting area Eb1 of the window 87, the visible light Lo is not greatly attenuated but can pass through the window 87, whereby the user can visually recognize the visible light Lo. Further, since the light emitting area Eb1 of the window 87 is disposed in the backwardly concave recess 87v of the front wall portion 87w, the recess 87v, which works as a concave mirror, can reduce glaring due to the light reflected off the light emitting area Eb1, which otherwise annoys the user who looks at the light emitting area Eb1.

In the thus configured grip cover GCb of the imaging apparatus 1B, the front wall portion 87w in the light emitting area (first area) Eb1, through which the visible light Lo from the light emitter 84 provided behind the front wall portion 87w passes and from which the visible light Lo exits, is thinner than the light receiving area (second area) Eb2, through which the infrared light Li to be received by the light receiver 85 provided behind the front wall portion 87w passes. As a result, the window through which the visible light Lo exits and the window through which the infrared light Li is received can be combined into the single window (window member) 87, whereby the space for disposing the two windows can be reduced.

<Variations>

Figure 10:
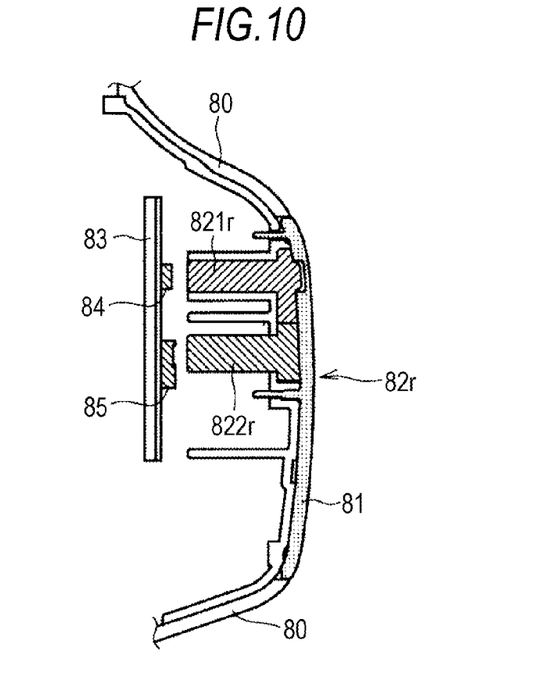
FIG. 10 describes a light guide according to a variation of the invention.

In the first embodiment described above, it is not essential to employ the light guide 82 obtained by integrating the light guide tube 821 for the light emitter 84 and the light guide tube 822 for the light receiver 85 as described with reference to FIG. 6, but a light guide 82r formed of separate components, a light guide tube 821r for the light emitter 84 and a light guide tube 822r for the light receiver 85, may be employed, as shown in FIG. 10. Alternatively, a window 81r (FIG. 11) integrated with the light guide tube 822r shown in the configuration in FIG. 10 but made of the material of the window may be employed. When the window 81r thus has an extension 81e extending from the light receiving area (second area) Ea2 to the vicinity of the light receiver 85, the IR material disposed in front of the light receiver 85 becomes thicker. It is therefore possible to effectively prevent the light other than infrared rays from being received by the light receiver 85.

Figure 11:
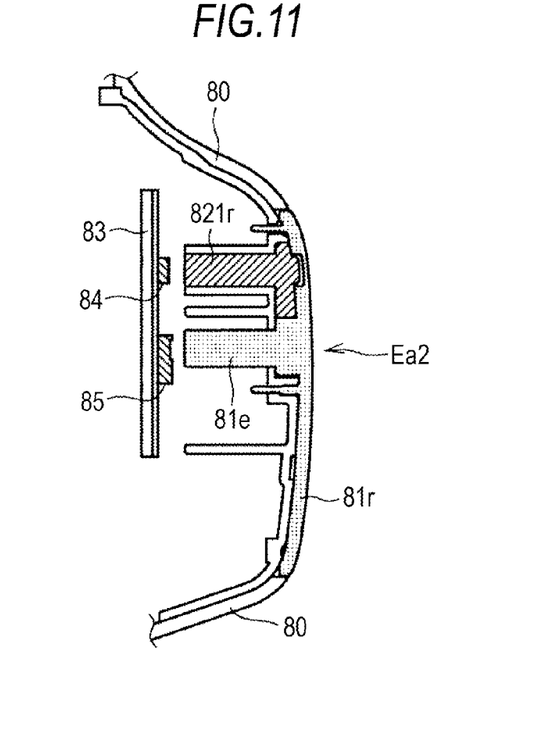
FIG. 11 describes a window according to another variation of the invention.

The configurations shown in FIGS. 10 and 11 are also applicable to the second embodiment.

In each of the embodiment described above, providing the light guide 82 or 88 is not essential, but the light guide may be omitted when the light emitter 84 and the light receiver 85 are located in positions close to the window 81 or 87.

In each of the embodiment described above, the window does not essentially contain the IR material that transmits infrared light, but may contain, for example, a material that attenuates visible light but primarily transmits ultraviolet light (specific light) when the remote controller emits ultraviolet light.

In each of the embodiment described above, the light emitting area Ea1 or Eb1 of the front wall portion is set to be approximately 0.5 mm in thickness, but the thickness is not limited thereto. That is, since the amount of visible light passing through the window varies with the intensity of the light emitted from the light emitter that emits visible light, the characteristics of the IR material, and other factors, the thickness may at least be smaller than a value at which a necessary amount of light passing through the window can be provided.

The invention is not necessarily applied to the imaging apparatus described above, but is applicable to electronic apparatus including PDAs (Personal Digital Assistants), mobile personal computers, and mobile phones.

While the invention has been described above in detail, the description is presented by way of example in any of the embodiments and the invention is not limited thereto. It is construed that a large number of variations that have not been presented can be contemplated without departing from the extent of the invention.

The present application contains subject matter related to that disclosed in Japanese Priority Patent Application JP 2009-041711 filed in the Japan Patent Office on Feb. 25, 2009, the entire contents of which is hereby incorporated by reference.

What is claimed is:

1. An imaging apparatus comprising:
a window member containing a material to attenuate visible light and to transmit infrared light that does not lie in a visible light wavelength band the window member having a front wall portion having a thickness extending along a direction from the front side to the rear side;
a light emitter, provided behind the front wall portion, to emit the visible light through a first area of the front wall portion; and
a light receiver, provided behind the front wall portion, to receive the infrared light passing through a second area of the front wall portion that differs from the first area,
wherein the front wall portion in the first area is thinner than the front wall portion in the second area;
further comprising a grip;
wherein the window member is assembled in the grip.

2. An electronic apparatus comprising:
a window member containing a material to attenuate visible light and to transmit specific light that does not lie in a visible light wavelength band, the window member having a front wall portion having a thickness extending along a direction from the front side to the rear side;
a light emitter, provided behind the front wall portion, to emit the visible light through a first area of the front wall portion;
a light receiver, provided behind the front wall portion, to receive the specific light passing through a second area of the front wall portion that differs from the first area,
wherein the front wall portion in the first area is thinner than the front wall portion in the second area;
further comprising a grip having a raised portion with a band-shaped top surface and capable of being used as a portion to be gripped,
wherein the window member has a band-shaped front surface, and
wherein the window member is assembled in the grip in such a way that a longitudinal direction of the band-shaped top surface substantially coincides with a longitudinal direction of the band-shaped front surface.

3. The imaging apparatus according to claim 1, further comprising light guide means including a first light guide to guide the visible light emitted from the light emitter to the first area of the front wall portion and a second light guide to guide the infrared light passing through the second area of the front wall portion to the light receiver.

4. The imaging apparatus according to claim 1,
wherein the window member has an extension extending from the second area of the front wall portion to the vicinity of the light receiver.

5. The imaging apparatus according to claim 1,
wherein the front wall portion has a backwardly concave recess, and
the first area is disposed in the backwardly concave recess.

6. A grip structure comprising:
a window member containing a material to attenuate visible light and to transmit specific light that does not lie in a visible light wavelength band, the window member having a front wall portion having a thickness extending along a direction from the front side to the rear side; and
a grip in which the window member is assembled, the grip being capable of being used as a portion to be gripped,
wherein visible light is emitted from a light emitter provided behind the front wall portion, the visible light exits through a first area of the front wall portion, and a light receiver provided behind the front wall portion is arranged to receive the specific light passing through a second area of the front wall portion that differs from the first area, and
wherein the front wall portion in the first area is thinner than the front wall portion in the second area.

* * * * *